March 25, 1941.  J. RAUSCH  2,236,380
MOTION PICTURE PROJECTOR APPARATUS
Filed Jan. 17, 1940  3 Sheets-Sheet 1
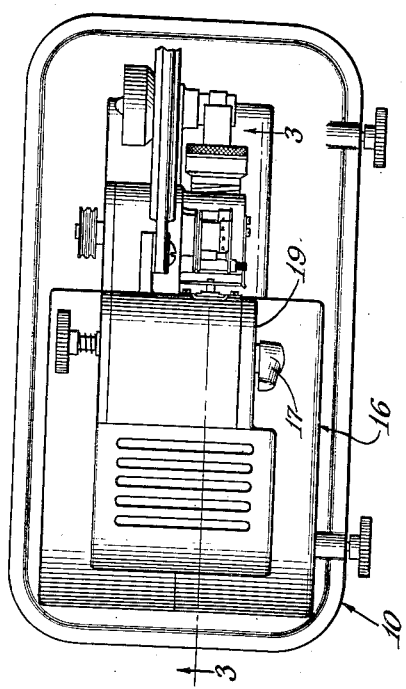
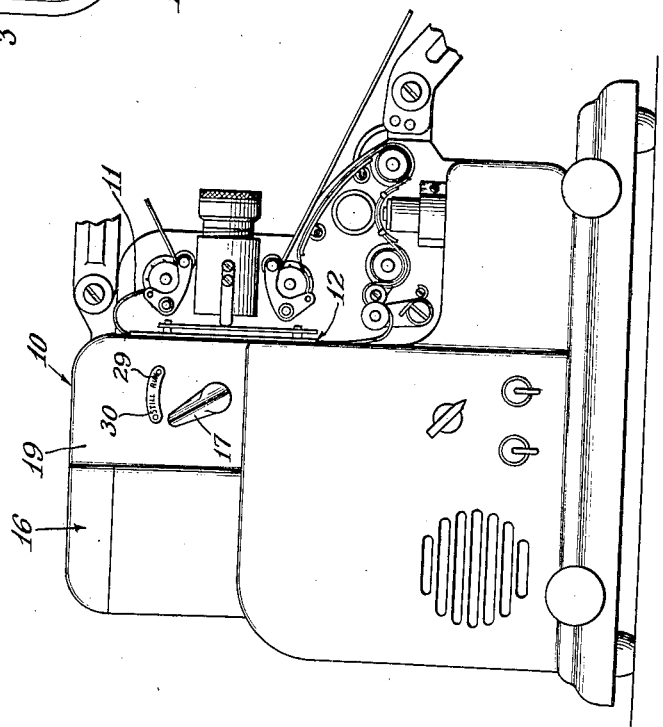
Inventor:
Joseph Rausch
By Belt, Wallace and Cannon
Attorneys

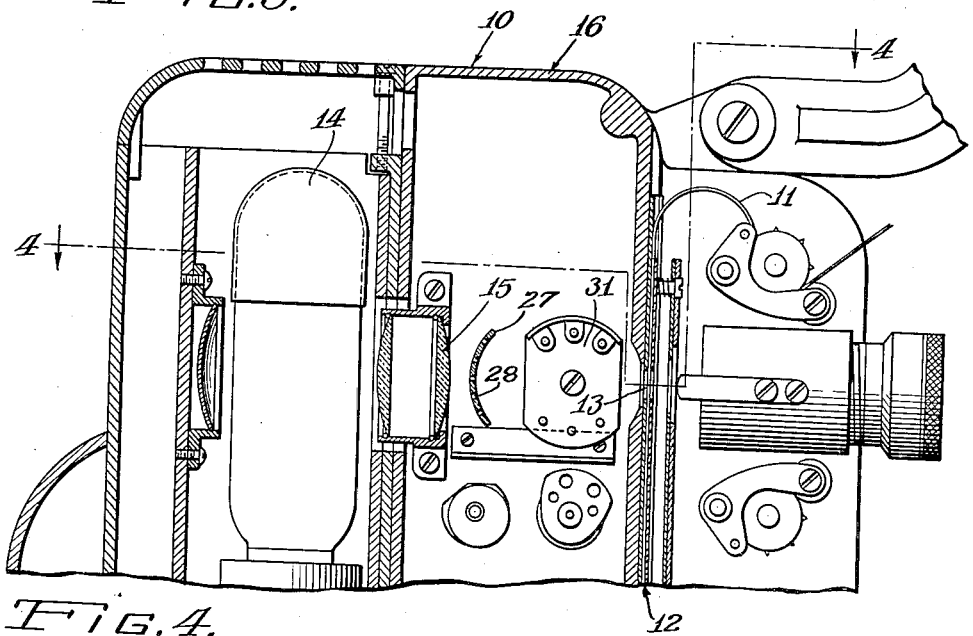
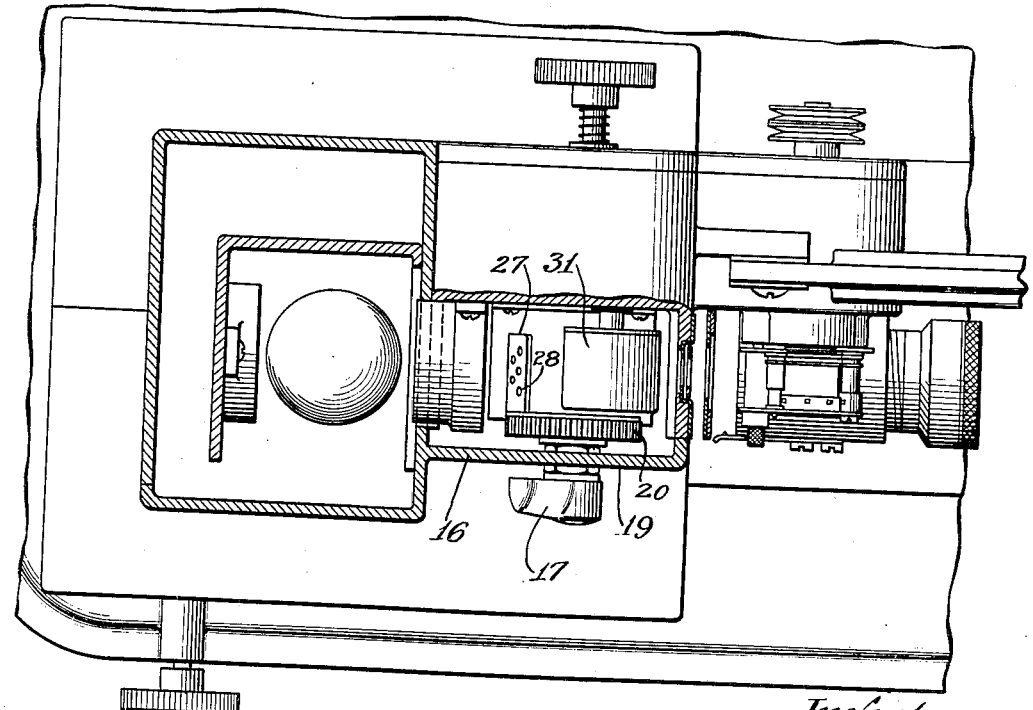

March 25, 1941.  J. RAUSCH  2,236,380
MOTION PICTURE PROJECTOR APPARATUS
Filed Jan. 17, 1940  3 Sheets-Sheet 3
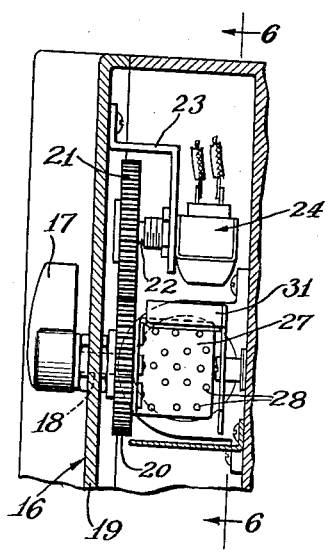
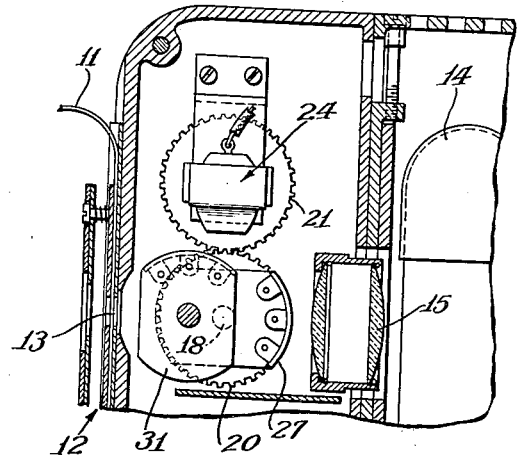
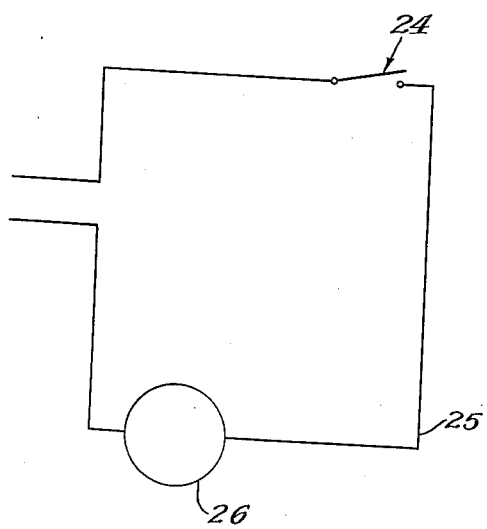
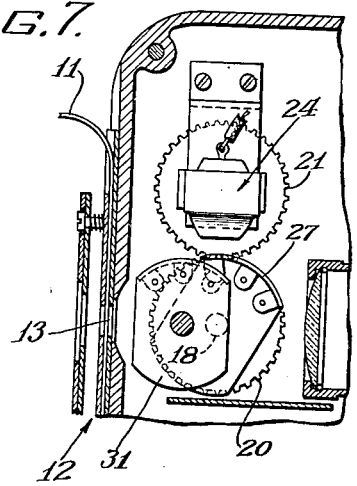
Inventor:
Joseph Rausch
By Belt, Wallace and Cannon
Attorneys Patented Mar. 25, 1941

2,236,380

UNITED STATES PATENT OFFICE 2,236,380

MOTION PICTURE PROJECTOR APPARATUS

Joseph Rausch, Oak Park, Ill., assignor to Classroom Laboratories, Inc., Chicago, Ill., a corporation of Delaware Application January 17, 1940, Serial No. 314,248

3 Claims. (Cl. 88—17)

This invention relates to a motion picture projector apparatus and, more particularly, to a motion picture projector of the type which is intended for use in homes, schools, and like places.

The primary object of the present invention is to provide a novel, simple and efficient device for enabling any particular or selected frame of a motion picture film to be exhibited as a still picture in a motion picture projector of the type referred to above.

It may be added, in this connection, that it is frequently desirable, in the use of projectors in homes, schools and like places, to be able to project a particular frame of a film, or a number of frames successively, as a still picture on a screen, for educational purposes, detailed study, or for other reasons. This, of course, necessitates the stopping of the film and the film-advancing device and, at the same time, requires that some precaution be taken to prevent the film from being blistered during the time when it is stationary, due to the intense heat of the light source or illuminating lamp, and another object of the present invention is to provide a new, simple and efficient device for accomplishing this result.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other forms of the invention embodying the same or equivalent principles may be used and structural changes may be made as desired by those skilled in the art without departing from the present invention and the purview of the appended claims.

In the drawings,

Fig. 1 is a fragmentary side elevational view of a motion picture projector embodying a typical and preferred form of the invention;

Fig. 2 is a top plan view of the same;

Fig. 3 is an enlarged vertical sectional view on line 3—3 in Fig. 2;

Fig. 4 is an enlarged sectional top plan view on line 4—4 in Fig. 3;

Fig. 5 is a fragmentary vertical sectional view showing the heat shield which is embodied in the new device in effective position;

Fig. 6 is a view on line 6—6 in Fig. 5, partly in section and partly in side elevation;

Fig. 7 is a view similar to Fig. 6 but showing the heat shield in its normal or ineffective position; and Fig. 8 is a diagrammatic view showing a circuit which is embodied in the present invention.

A motion picture projector of the so-called home (16 mm. or 8 mm.) type is shown, in part, in Figs. 1 and 2 of the drawings, wherein the same is generally indicated at 10, only such parts thereof being shown in the drawings and described hereinafter as are necessary for an understanding of the present invention.

As is well known in the art, in the operation of a motion picture projector the film 11 is continuously moved through the film gate 12 in front of the light aperture 13, and the barrel shutter 31, the frames of the film being successively illuminated by light from the light source or lamp 14 and condenser lenses 15, all of which parts are conventional in the art and are shown as being mounted in a housing which is generally indicated at 16.

In order to accomplish the desired result, I provide the following novel arrangement and mechanism: To this end I provide a small manually operable control member in the form of a lever 17 which is pivotally mounted on a vertical wall 19 of the housing 16, this arm being mounted at one end of a small shaft 18 which is journaled in the wall 19 of the housing 16. Mounted on the inner end portion of the shaft 18 (Fig. 5), within the housing 16, is a gear 20 which meshes with a second gear 21, this gear 21 being mounted upon a shaft 22 which is journaled in a bracket 23 which is mounted in the housing 16 (Fig. 5). Associated with and operated by this shaft 22 is a conventional switch, which is generally indicated at 24, and which controls a circuit 25 (Fig. 8) to the operating motor 26 for the film-advancing device of the projector.

Attached to and carried by the shaft 18 on the inner end portion thereof is an arcuate-shaped metal heat screen 27 which is provided with perforations 28 (Fig. 4), this heat screen 27 being made of any suitable metal having good heat-conductive properties.

The operation of this device is as follows: When using the projector in the conventional and customary manner the film 11 is continuously moved through the film gate 12, by a suitable film-advancing device, (not shown) in the usual manner, and in this conventional use of the projector the manually operable control member 17 is positioned so that it indicates a point to the right of the position in which it is shown in Fig. 1, this point being marked "Run" and being indicated at 29. In this position of the control member 17 the heat screen 27 is disposed in its normal or ineffective position, in which it is shown in Fig. 7, that is to say, it is disposed above and out of the path of light traveling from the light source or lamp 14 and the condenser lenses 15 to the light aperture 13 in the film gate 12 so that the frames of the film 11 may be successively illuminated as they pass through the film gate 12.

However, when, for any reason, it is desired to project a single frame of the film 11 upon the screen, as a still picture, the manually operable control member 17 is turned to the left of the point 29 into the position in which it is shown in Fig. 1, this position being indicated at 30 and being marked "Still." This movement of the manual control member 17 performs a dual function, that is to say, in the performance of one of its two functions it acts, through the shaft 18, gear 20, gear 21 and shaft 22 to open the switch 24 to the operating motor 26 for the film-advancing device, a separate motor, not shown, being employed in the projector 10 for operating the air fan for cooling the lamp 14.

Simultaneously with the opening of the switch 24 to the operating motor 26 for the film-advancing device, the above-mentioned movement of the manual control member 17 acts, through the shaft 18, to rotate the perforated heat screen or guard 27 down into effective position, that is to say, into a position (as shown in Fig. 6) in which it is disposed in the path of light flowing from the light source or lamp 14 and condenser lenses 15 to the light aperture 13 of the film gate 12. When in this position the heat screen 27 allows sufficient light to pass through the perforations 28 therein to illuminate the particular frame of the film 12 which is disposed in registration with the light aperture 13 of the film gate 12 to enable the said frame to be projected upon the screen as a still picture. At the same time, however, the metal heat screen 27 conducts sufficient heat away from or out of the path of light to prevent blistering of the film 11 during the time the film is stationary.

When it is desired to resume continuous operation of the film 11, the manual control member 17 is returned to its initial position, as at 29, in Fig. 1, this movement of the member 17 acting, through the shaft 18, gear 20, gear 21 and shaft 22 to close the switch 24 and the circuit 25 (Fig. 8) to the operating motor 26 for the film-advancing device. At the same time this movement of the manual control member 17 acts, through the shaft 18, to rotate the heat screen 27 up into its normal or ineffective position, (as in Fig. 7), and in which position it is disposed out of the path of light flowing from the light source or lamp 14 and the condenser lenses 15 to the light aperture 13 of the film gate 12 so that the frames of the film 11 may be successively illuminated in the usual way.

It will thus be seen that the present invention provides a simple but efficient device for enabling any particular frame of a film to be projected as a still picture by means of motion picture projector of the so-called home or 16 mm. or 8 mm. type without interfering with or stopping the operation of the motor which operates the air cooling fan and in such a manner as to prevent the film from being blistered or burned during the operation of projecting a particular frame of the film as a still picture.

While the invention has been illustrated and described as applied to a projector of the so-called 8 mm. or 16 mm. type it may also be applied to larger projectors of the commercial or 35 mm. type.

While I have illustrated and described preferred forms of construction for carrying my invention into effect, these are capable of variation and modification, without departing from the spirit of the invention. I, therefore, do not wish to be limited to the precise details of construction set forth, but desire to avail myself of such variations and modifications as come within the scope of the appended claims.

I claim:

1. In a motion picture projector, the combination of, a housing, a film gate provided with a light aperture, a light source in the said housing, an electric motor for operating the film-advancing device embodied in said projector, a switch for controlling circuit to said motor, a light-penetrable heat screen normally disposed out of the path of light traveling from said light source to the said light aperture, a shaft rotatably journaled in the said housing for supporting the said heat screen, and means including a manually operable control member, cooperable with the said shaft, for simultaneously operating the said switch and moving the said heat screen into effective position in the path of light traveling from the said light source to the said light aperture, said last-named means including a second shaft rotatably journaled in the said housing for operating the said switch, and a gear train between said shafts.

2. In a motion picture projector, the combination of, a housing, a film gate provided with a light aperture, a light source in the said housing, an electric motor for operating the film-advancing device embodied in said projector, a switch for controlling circuit to said motor, an arcuate-shaped, perforated metal heat screen normally disposed out of the path of light traveling from said light source to the said light aperture, a shaft rotatably journaled in the said housing for supporting the said heat screen, and means including a manually operable control member, cooperable with the said shaft, for simultaneously operating the said switch and moving the said heat screen into effective position in the path of light traveling from the said light source to the said light aperture, said last-named means including a second shaft rotatably journaled in the said housing for operating the said switch, and a gear train between said shafts.

3. A device for a motion picture projector of the character providing a housing, a film gate provided with a light aperture, a light source in said housing, and an electric motor for operating the film-advancing mechanism embodied in said projector, said device comprising a switch controlling the circuit to said motor, an arcuate-shaped perforated metal heat screen normally disposed out of the path of light traveling from said light source to said light aperture, two shafts rotatably journaled in said housing, one of said shafts supporting the said heat screen, a gear carried by the said one of said shafts, the other one of said shafts being adapted to operate said switch, a gear carried by said other one of said shafts and meshing with the said gear carried by the said first-named one of said shafts, and a manually operable control member cooperable with said first-named one of said shafts for simultaneously operating the said switch and moving the said heat screen into effective position in the path of light traveling from the said light source to the said light aperture.

JOSEPH RAUSCH.